United States Patent [19]
Hammond

[11] Patent Number: 5,974,470
[45] Date of Patent: Oct. 26, 1999

[54] SYSTEM FOR REDUCING CONFLICTS AMONG DYNAMIC LINK LIBRARY MODULES BY ALIASING MODULES

[75] Inventor: Richard P. Hammond, Simsbury, Conn.

[73] Assignee: Chicago-Soft, Ltd., Bloomfield, Conn.

[21] Appl. No.: 08/923,056

[22] Filed: Sep. 3, 1997

[51] Int. Cl.$^6$ .................................................. G06F 9/445
[52] U.S. Cl. ........................ 709/305; 707/203; 709/302; 395/712; 395/710
[58] Field of Search .......................... 707/203; 395/712, 395/682, 685, 710; 709/302, 305

[56] References Cited

U.S. PATENT DOCUMENTS

| | | | |
|---|---|---|---|
| 5,603,027 | 2/1997 | Ohkami | 707/200 |
| 5,764,992 | 6/1998 | Kullick et al. | 395/712 |

OTHER PUBLICATIONS

Livingston, Brian, *InfoWorld*, "The case of the conflicting DLLs—chapter 1", vol. 18, issue 36, Sep. 2, 1996.
Livingston, Brian, *InfoWorld*, "Out, out, damned GPFs. Get thee to a link library!", vol. 18, issue 37, Sep. 9, 1996.
Livingston, Brian, *InfoWorld*, "Handling DLLs the Microsoft way: improperly", vol. 18, issue 38, Sep. 16, 1996.
Livingston, Brian, *InfoWorld*, "What's the big DLL? A fix would be appreciated", vol. 18, issue 39, Sep. 23, 1996.
Livingston, Brian, *InfoWorld*, "Applications can help get you out of life in DLL hell", Feb. 16, 1998.

*Primary Examiner*—Kenneth S. Kim
*Attorney, Agent, or Firm*—McDonnell Boehnen Hulbert & Berghoff

[57] ABSTRACT

A system for managing DLL modules and providing administrators of Windows based PCs with more control over Windows modules. The invention beneficially patches standard Windows API call logic with code that serves to (i) more accurately load the correct DLLs associated with specified applications, (ii) enable multiple DLLs of the same name to be loaded simultaneously where otherwise precluded (such as in a 16-bit Windows environment) and (iii) efficiently track module use and the relationships between modules at run-time.

21 Claims, 9 Drawing Sheets

Microfiche Appendix Included
(2 Microfiche, 158 Pages)

SYSTEM FOR REDUCING CONFLICTS AMONG DYNAMIC LINK LIBRARY MODULES BY ALIASING MODULES

MICROFICHE APPENDIX

This document contains a microfiche appendix, which consists of 2 sheets of microfiche and a total of 153 frames.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates to dynamic link library modules in a computer system and more particularly to a system for reducing conflicts that arise in loading these modules as required by computer applications.

As described by Jeffrey Richter, "Advanced Windows" (Microsoft Press, 3d ed. 1997), Dynamic link libraries serve as the cornerstone of computer operating systems such as Microsoft Windows and IBM OS/2. A dynamic link library, or DLL, is a computer code module that contains functions to be linked with application code at run time. In contrast to a standard programming library, whose functions are linked into an application when the application's code is compiled, a DLL may be loaded and linked to an application at run time, and then unloaded when no longer needed.

A DLL usually consists of a set of autonomous functions that any application can use.

These function are typically those that the application alone could not handle, such as special dialog box controls. There is usually no support code for processing message loops or creating windows within DLLs. Rather, a DLL is simply a set of source code modules, with each module containing a set of functions. These functions are written with the expectation that an application (EXE file) or another DLL will call them.

In 32-bit Windows operating systems such as Windows NT, Windows 95 and Windows CE, for instance, all of the functions in the Win32 API (application programming interface) are contained in DLLs. These DLLs include, for example, KERNEL32.DLL, which consists of functions for managing memory, processes, and threads; USER32.DLL, which consists of functions for performing user-interface tasks such as window creation and message sending; and GDI32.DLL, which consists of functions for drawing graphical images and displaying text.

In the 32-bit Windows environment, for an application or another DLL to call functions contained within a DLL, the DLL's file image must first be mapped, or copied from some data storage device such as a disk drive, into the calling process's address space, by either implicit load-time linking or explicit run-time linking, as discussed more below. Once the DLL's file image is mapped into the calling process's address space, the DLL's functions are available to all the threads running within that process. Another process running at the same time will not have access to the DLL and its functions until the DLL is also mapped into the other process's address space.

In contrast, in the 16-bit Windows environment, when a DLL is loaded, the DLL becomes part of the operating system. The DLL exists in common memory space in order to reduce memory use. Therefore, after the DLL is loaded, any and all of the applications currently running have immediate access to the DLL and its functions.

In any Windows operating system, each module loaded into a process's address space is assigned a unique instance handle or module handle used by the operating system to refer to the module. The actual value of the module handle is the base memory address where the operating system loaded the module into the calling process's address space.

A DLL's file image may be mapped into the address space of a calling thread's process in one of two ways, either implicitly linking to functions in the DLL or explicitly loading the DLL. To implicitly link DLLs, a linker embeds information into the header of the application's EXE file indicating the name of DLLs containing functions that the EXE requires. When the operating system loads an EXE file, the system examines the contents of the EXE file image, such as the header of the EXE module, to determine which DLLs must be loaded for the application to run. The system then attempts to map the required DLL file images into the process's address space. If the system cannot locate the DLL, the system displays an error message and terminates the entire process. With implicit linking, any DLL file images mapped into the process's address space are not unmapped until the process is terminated.

Alternatively, to explicitly link a DLL's file image into a process's address space, one of the process's threads must call the LoadLibrary or LoadLibraryEx function at run-time. These functions locate a file image on the user's system and attempt to map the DLLs' file image into the calling process's address space. If the DLL could not be mapped into the process's address space, the function returns a NULL or other value indicative of an error.

According to existing module load search rules in the Windows operating system, when the system receives a request to load a DLL module, the system first makes one or more preliminary determinations. In the 16-bit Windows environment, the system first determines if a DLL module having the same name as the requested DLL is already loaded into the common memory space. If so, the system completes the load process by returning the handle of the existing module, thereby preventing two modules of the same name from being open at the same time. In addition, in any Windows environment, the system determines if the requested module is fully qualified with path information. If the module is fully qualified, the system attempts to load the module from the associated path. If the module is not qualified, however, the system searches for the module in the following locations:

In the 32-bit Windows Environment:
1. The directory from which the application (EXE image) loaded
2. The process's current directory
3. The Windows system directory
4. The 16-bit Windows system directory (for Windows NT only)
5. The Windows directory
6. The directories listed in the PATH environment variable In the 16-bit Windows Environment:
1. The current directory
2. The Windows directory
3. The Windows system directory
4. The directory from which the application (EXE image) loaded 5. The directories listed in the PATH environment variable Unfortunately, this existing module search and load logic is deficient for several reasons. Principally, the existing logic searches for an unqualified module file and may therefore locate and load different versions of the same file at different times. As noted by Windows expert Brian Livingston in the Sep. 2, 9 and 16, 1996 issues of InfoWorld, Microsoft and other vendors provide a number of shared DLLs with their applications, and different versions of these DLLs may have the same name. When a user installs a new application that also uses one of these DLLs, the application may install a version of a DLL that is older or different than the one the other applications support. Because one version of a DLL may not have a programming call that a another version of the same-named DLL supports, conflicts may arise.

For example, Mr. Livingston states that the DLL called "OLE2NLS.DLL" is used by Microsoft Office 4.0, 4.2, 4.2c, 4.3, 4.3c, Microsoft Excell 5.0, 5.0c, Microsoft Word 6.0, 6.0a, 6.0c, Microsoft PowerPoint 4.0, 4.0c, Microsoft Project 4.0, and Microsoft Visual FoxPro 3.0 is Version 2.01. However, according to network analyst Michael Green of Paranet Inc., in Houston, Tex., Microsoft Office 4.3c cannot use OLE2NLS.DLL Version 2.02.

Additionally, the existing module search logic is not versatile. The existing logic may attempt to load a particular DLL module when in fact the application or the end user requires another module to be loaded instead. For example, the "OLE" (object linking and embedding) application includes hard coded DLL paths. However, when running the OLE application, a user may wish to use some other DLL version. Unfortunately, existing module search logic will not permit variance from the hard coded path. As another example, the "ODBC" (open database connectivity) application regularly loads modules twice, once based on a qualified module name and once based on an unqualified name. ODBC will then use the more recent version of the two modules. A user, however, may wish to use the older version module. Again, though, the existing module search logic will not permit this variance.

Still further, in the 16-bit Windows environment, it is often necessary to load multiple versions of the same-name DLL module, in order to enable several different applications to run at once. Therefore, an operating system that prevents two modules of the same name from being open at the same time may give rise to additional conflicts, possibly preventing one of the applications from running.

A need therefore exists for an improved system for managing DLL modules that will overcome the foregoing deficiencies.

SUMMARY OF THE INVENTION

The present invention is a system for managing DLL modules and providing administrators of Windows based PCs with more control over Windows modules. The invention beneficially patches standard Windows API call logic with code that serves to (i) more accurately load the correct DLLs associated with specified applications, (ii) enable multiple DLLs of the same name to be loaded simultaneously where otherwise precluded (such as in a 16-bit Windows environment) and (iii) efficiently track module use and the relationships between modules at run-time.

BRIEF DESCRIPTION OF THE DRAWINGS

Preferred embodiments of the present invention are described herein with reference to the drawings, in which.

DETAILED DESCRIPTION OF THE PREFERRED EMBODIMENTS

Figure 1:
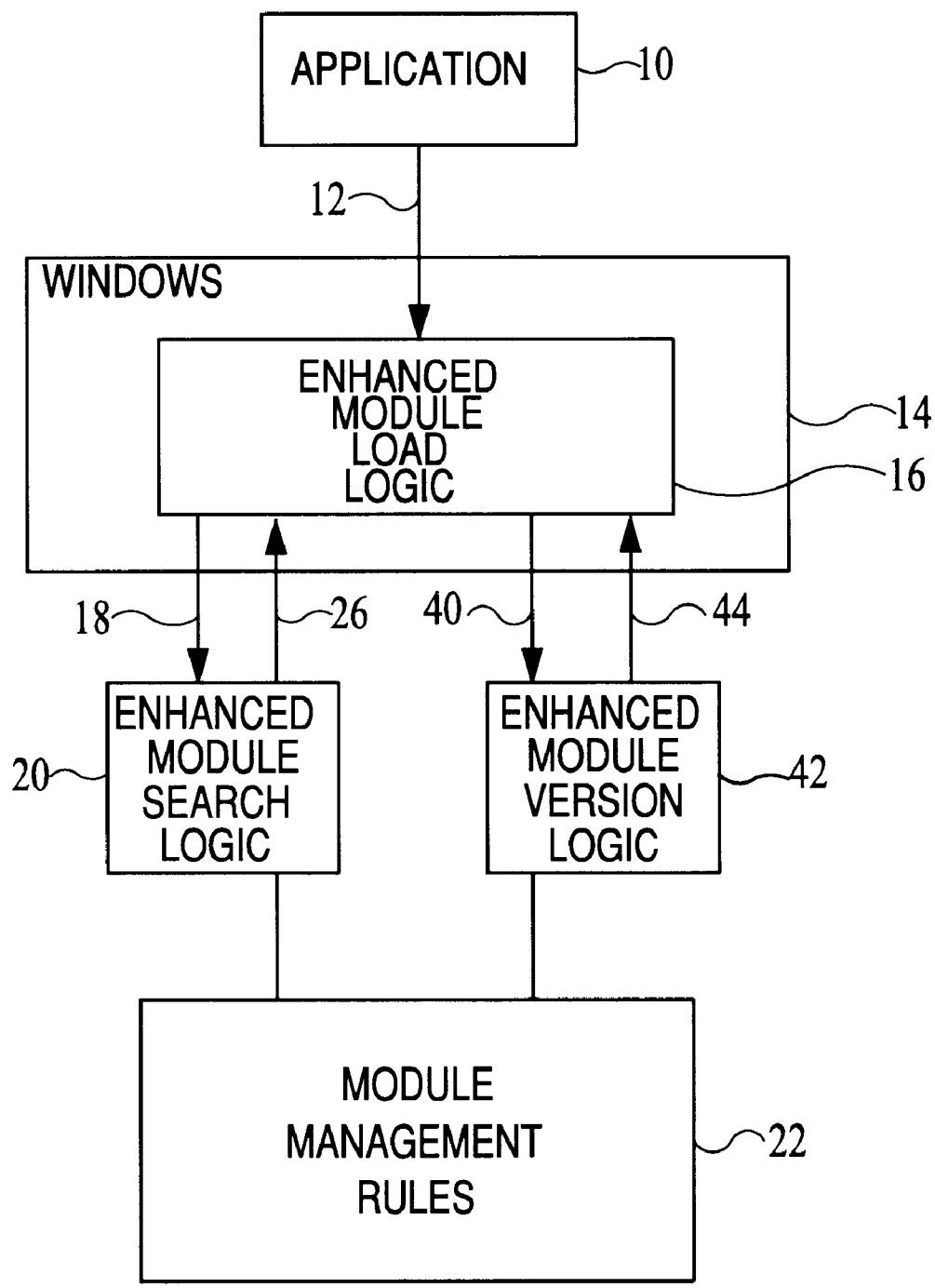
FIG. 1 is a block diagram illustrating the process flow of enhanced module load logic in accordance with a preferred embodiment of the present invention.

The present invention provides improved management of DLL modules by applying one or more software patches to the operating system's loading (or freeing) functions. In the preferred embodiment, one set of patches provides enhanced module load logic, which may include enhanced module search logic and enhanced module version logic, and another set of patches provides module usage data collection logic. Each patch is preferably applied by inserting a "jump" command or function call in the operating system's code, thereby causing the system to continue execution at the address of the patch code. Alternatively, a call to a function that in turn calls a patch of the present invention may be placed in the operating system code, rather than inserting a call directly to the patch code. Beneficially, the patches of the present invention are transparent to the operating system, in that they manipulate data passed between portions of the operating system code without the code's knowledge.

The exact location of the patch embodying the present invention will depend on the current coding for the Windows system and the Windows function at issue. Because systems and functions vary, it is not possible to describe with certainty where to insert the patches of the present invention. In practice, however, the insertion points may be located by employing a combination of the following software programs: (i) "Windows Source Processor" and "Sourcer," which are sold by V Communications, Inc., of San Jose, Calif., and (ii) "Soft-ICE," which is sold by Nu-Mega Technologies, Inc., of Nashua, N.H. The "Windows Source Processor" and "Sourcer" programs are run sequentially to disassemble the Windows code. Next, the "Soft-ICE" program provides a debugging tool, allowing a programmer to insert breakpoints in the code and watch registers and other states during code execution. The "Soft-ICE" program therefore allows a programmer to determine the best place to insert the patches of the present invention in the system code. Additionally, for assistance in establishing appropriate patch locations, a programmer may refer to Chapter 9 of Matt Pietrek's "Windows 95 System Programming Secrets" (IDG Books Worldwide, 1995), which is entitled "Spelunking on Your Own."

As will be described below, a user or system administrator (referred to as a "user") may set module management rules for specific applications and/or for specific DLLs, in order to facilitate the enhancements provided by the present invention. In the preferred embodiment, these rules may be placed in one or more specially designated configuration files (for instance, files with the suffix *.DGR) associated with the applications and/or DLLs and may include Boolean flags indicating settings for the given modules. These flags may include, for instance, "search", "system", "shared", "version" and "alias" flags, each of which will be described below.

Alternatively, or additionally, the module management rules may be associated with a more complex database of rules associated with particular applications or with particular DLL modules and may be automatically or manually set or modified at designated times such as upon installation of an application.

1. Enhanced Module Load Logic

The enhanced module load logic of the present invention serves in part to modify the system load logic for specified applications, in order to direct the operating system to load the correct DLLs required for the given application. Often, the correct DLLs are located in the application's own directory (the applications' executable, EXE or "home" directory) or in some other specified directory such as the Windows "system" directory. To direct the operating system to load appropriate DLLs, in the preferred embodiment of the present invention, a user may selectively turn on a location rule such as the "search" rule for a particular application (by setting the "search" flag for the application to TRUE), and/or the "system" or "shared" rule for a particular DLL (by setting the "system" or "shared" flag for the DLL to TRUE). It will, of course, be understood that the names for these location rules are used for convenience and are not intended to limit the scope of this invention. Additionally, it will be appreciated that additional or alternative rules may be employed within the scope of the invention.

In the preferred embodiment, the "search" rule signifies that DLLs for the specified application are located in the application's EXE directory or in some other directory specified by the module management rules. The "system" rule signifies that the specified DLL is located in the Windows "system" directory. Finally, the "shared" rule signifies that the specified DLL is located in a common directory referred to as the "shared" directory. As will be described more below, the "shared" directory may conveniently hold particular versions of DLLs that are used by many applications.

When one of these enhanced searching rules is set, the patch of the present invention seeks to bypass the standard search logic of the operating system by replacing the requested module name with a fully qualified path to the requested module. FIG. 1 illustrates the process flow of this enhanced module load logic in a preferred embodiment of the present invention. As shown, an application 10 first issues an API call 12 to the Windows operating system 14 that results in a function call in Windows to load a module. Examples of current API calls that result in a load function call (and accordingly the execution of a set of machine language instructions that may be referred as a module-load routine) are CreateProcess, LoadLibrary, LoadLibraryEx, LoadModule, and WinExec. The root 16 of the inventive patch is inserted in the standard Windows module load function and, either directly or through another function call 18, employs enhanced module search logic code 20. The enhanced module search logic 18 of the present invention in turn uses the module name requested by the application, as well as the identity of the EXE file of the requesting process, to identify the module that actually needs to be loaded into memory in response to the request.

Figure 2:
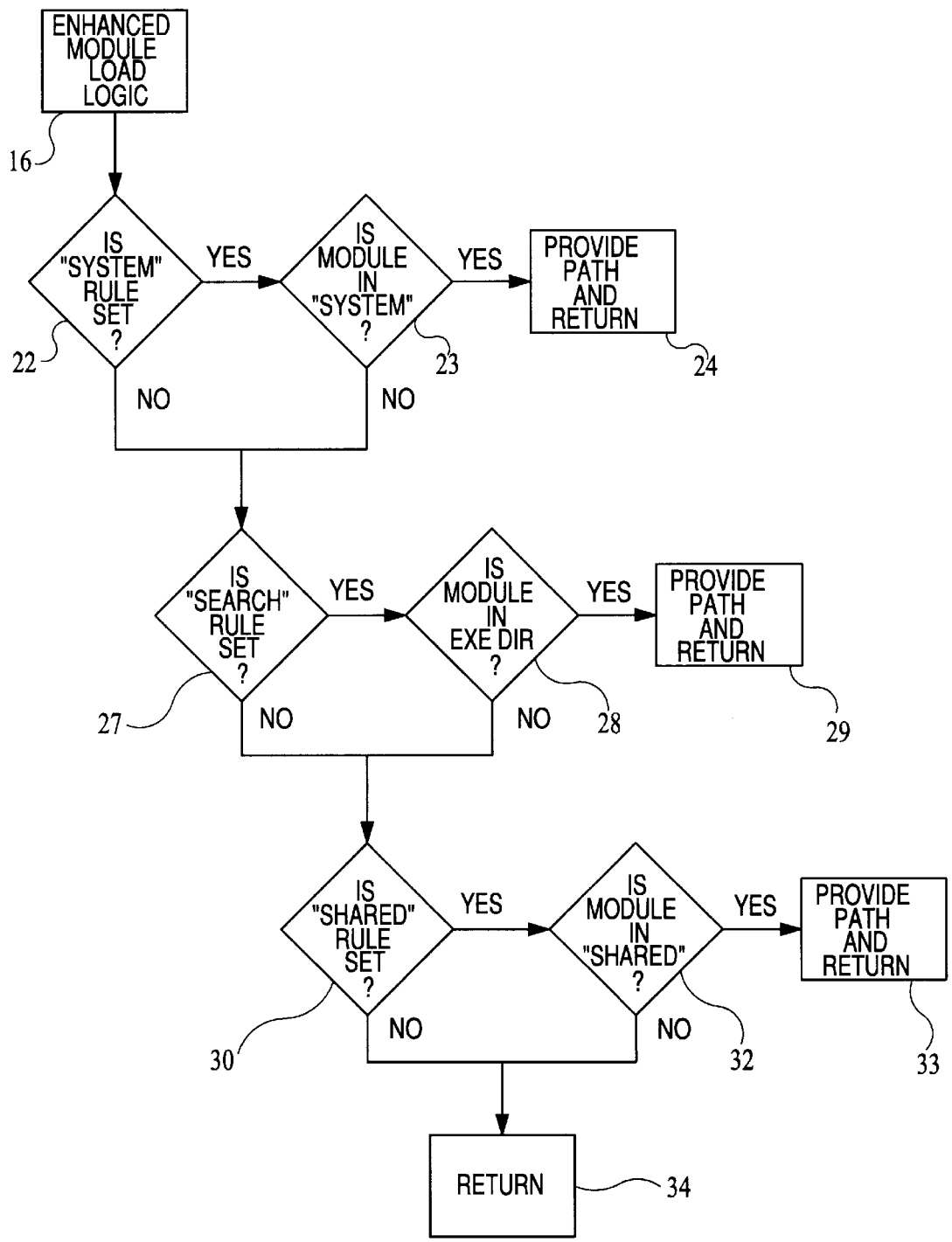
FIG. 2 is a flow chart of the enhanced module search logic illustrated in FIG. 1.

FIG. 2 illustrates a flow chart of the process performed by this logic 20 in a preferred embodiment of the present invention. As shown at step 22, the logic 20 first refers to the module management rules 22 to determine whether the "system" rule is set for the requested DLL module. If the "system" rule is set, then, at step 23, the logic 20 searches in the Windows "system" directory for a module having the requested name. If the logic 20 finds the requested module in the "system" directory, then, at step 24, the logic replaces the requested name with a fully qualified path to that DLL and returns the modified module name 26 to root 16 of the patch. Root 16 of the patch the passes the resulting name 26 to the standard Windows load logic.

If the "system" rule for the requested DLL is not set, or if the "system" rule is set but the requested DLL is not located in the Windows "system" directory, then, as shown at step 27, the logic 20 refers to the module management rules to determine if the "search" rule is set for the requesting application. If the "search" rule is set, then, at step 28, the logic 20 searches in the requesting application's EXE directory (or other directory specified by the rules) for a module having the requested name. If the logic 20 finds the requested module in the EXE directory, then, at step 29, the logic replaces the requested name with a fully qualified path to that module and returns the modified name 26 as indicated above.

In the preferred embodiment, if the "search" rule is not set, or the "search" rule is set but the requested DLL is not located in the specified location, then, at step 30, the logic 20 refers to the module management rules to determine if the "shard" rule is set for the requesting application. If the "shared" rule is set, then, at step 32, the logic 20 searches in the "shared" directory for a module having the requested name. If the logic 20 finds the requested module in the "shared" directory, then, at step 33, the logic replaces the requested name with a fully qualified path to that module and returns the modified name 26 as indicated above. If, however, the logic 20 does not find the requested module in the "shared" directory, then, as indicated at step 34, the logic preferably exits and returns without changing the path or name of the requested module.

Provided with the fully qualified file name, Windows then proceeds to load the module from the specified path. Alternatively, absent a fully qualified path, Windows proceeds to search for the module according to its default search rules.

According to the preferred embodiment of the present invention, when a location rule (such as "system", "search" or "shared") is set for an application and enhanced logic 22 finds the requested module in the specified directory, the located module should be loaded. In the 16-bit Windows environment, however, if another DLL module with the same name is already loaded into memory, standard Windows load logic will preclude the requested module from being loaded, as noted above. This will give rise to a conflict and possibly a system error. To avoid this problem, the present invention additionally provides a set of module version logic patches.

Principally, the module version logic of the present invention recognizes that when the standard Windows module load logic tests for already-loaded modules, it compares the requested name with all currently loaded module names. Therefore, to circumvent the single-module load restriction, the invention conveniently assigns a unique alias name to each module and transparently passes the alias name to the standard Windows load function. More specifically, in the preferred embodiment, when a module of the requested name is already loaded, the version logic of the present invention makes a copy of the requested module file and saves the copy under a unique alias name in an alias file directory. The patch then passes the name of this alias file to the standard Windows load function, and Windows loads the alias file copy under the alias name rather than under its actual (duplicate) module name.

The alias name used for a given module should uniquely identify the module. For this purpose, a file name of the form "~AKAxxxx" is believed to be sufficiently uncommon. Therefore, the module version logic of the present invention preferably employs such a name to identify a module being loaded. The characters "xxxx" in this alias name are numbers sequentially incremented each time the module version logic assigns a new alias name on the given computer. In the preferred embodiment, this number sequence is reset each time the operating system is refreshed.

Additionally, for reasons that will be explained below, the version patch of the present invention may associate a unique version key with any module. This version key may be used to uniquely identify a module (for instance, upon comparison with another copy of the module). In the preferred embodiment, the version key is computed from information contained in the header of the 16-bit module file. Specifically, the version key is preferably computed as the sum of the following elements indicated in the header:

the number of segments
the sum of the segment sizes
the sum of each segment size squared
the number of resources
the sum of the resource sizes
the sum of the resource sizes squared Of course, it will be appreciated that the present invention is not limited to this specific formulation of a version key but may employ other sufficiently unique information to identify the version of a module.

In the preferred embodiment, a user may conveniently turn on the "version" rule for a particular application (by setting the "version" flag to TRUE, for instance, in the module load rules), in order to indicate that the application requires a specific version of a DLL that is located in the application's EXE directory. Alternatively, upon installing the given application, the version rule for the application may be turned on automatically if appropriate. Still alternatively, or additionally, a more complex set of module management rules as suggested above may indicate DLL version requirements for various EXE modules. These rules may specify particular DLL versions required for various EXE modules (for instance, by a version key as calculated above), rather than imposing a version restriction generally for all DLLs associated with given applications. Additionally, as indicated above, these rules may indicate the locations of DLLs required for specified EXE modules, rather than being restricted to DLLs located in the application's EXE directory. For purposes of illustration, however, the following discussion assumes that the required DLLs for a specified application would be located in the application's EXE directory.

In the preferred embodiment, when the "version" rule is set for an application, the "search" rule discussed above is necessarily set for the application. This arrangement, in combination with the "shared" rule discussed above, proves useful, especially if many applications require the same version of a given DLL. For example, if ten applications require version 1.0 of a DLL but one application requires version 2.0 of the same-named DLL, a system administrator may conveniently place version 1.0 of the DLL in the "shared" directory and set the "search" rule only for the one other application, without having to set version rules for the other ten applications. Because the enhanced module search logic of the present conveniently checks the "search" rule before checking the "shared" rule, the invention would properly apply use version 1.0 of the DLL for all ten applications and version 2.0 of the DLL for the other application.

Still further, in the preferred embodiment, a user may turn on the "alias" rule for a particular application (by setting the "alias" flag to TRUE, for instance, in the module load rules), in order to indicate that DLL modules loaded for the application should be loaded under alias names. In the preferred embodiment, for instance, if the "version" rule for an application is set and the system has located the requested module in the application's EXE directory, but the same name loaded module is already loaded into memory, the "alias" rule indicates whether to load the requested module under an alias name or, alternatively, to indicate that the load request failed. In most cases, if the "version" rule for an application is set, the "alias" rule would also be set. However, the "alias" rule beneficially provides an additional measure of user control.

In order to maintain a record of alias file names assigned to loaded modules, and to facilitate reference to those files, the module version logic of the present invention preferably employs two databases that may be referred to as the "AKA database" and the "alias list database." Updated at the completion of an alias load, each of these databases conveniently maps an alias-named (loaded) file with the file from which it was copied, although each works in a different way and serves a different purpose. The AKA database preferably relates a real module name with the version key of the module and with the AKA number (the "xxxx" sequence) of the corresponding alias file. As will be described below, the present invention uses this information when performing an alias load, in order to avoid unnecessarily making multiple alias copies of the same module. The alias list database, in contrast, relates the module handle of an alias-loaded module with the name of the real module from which the alias was copied. In the preferred embodiment, both of these databases take the form of simple link lists that may be updated as necessary. Alternatively, however, one or more other types of databases may be used.

The module version logic of the present invention will be better understood with reference to the figures. Referring first to FIG. 1, after employing the enhanced module search logic discussed above, the root 16 of the inventive patch preferably employs enhanced module version logic code 42, either directly or through another function call 40. The enhanced module version logic 42 then determines whether the requested module should be loaded under an alias and, if so, facilitates and records the alias load.

Figure 3A:
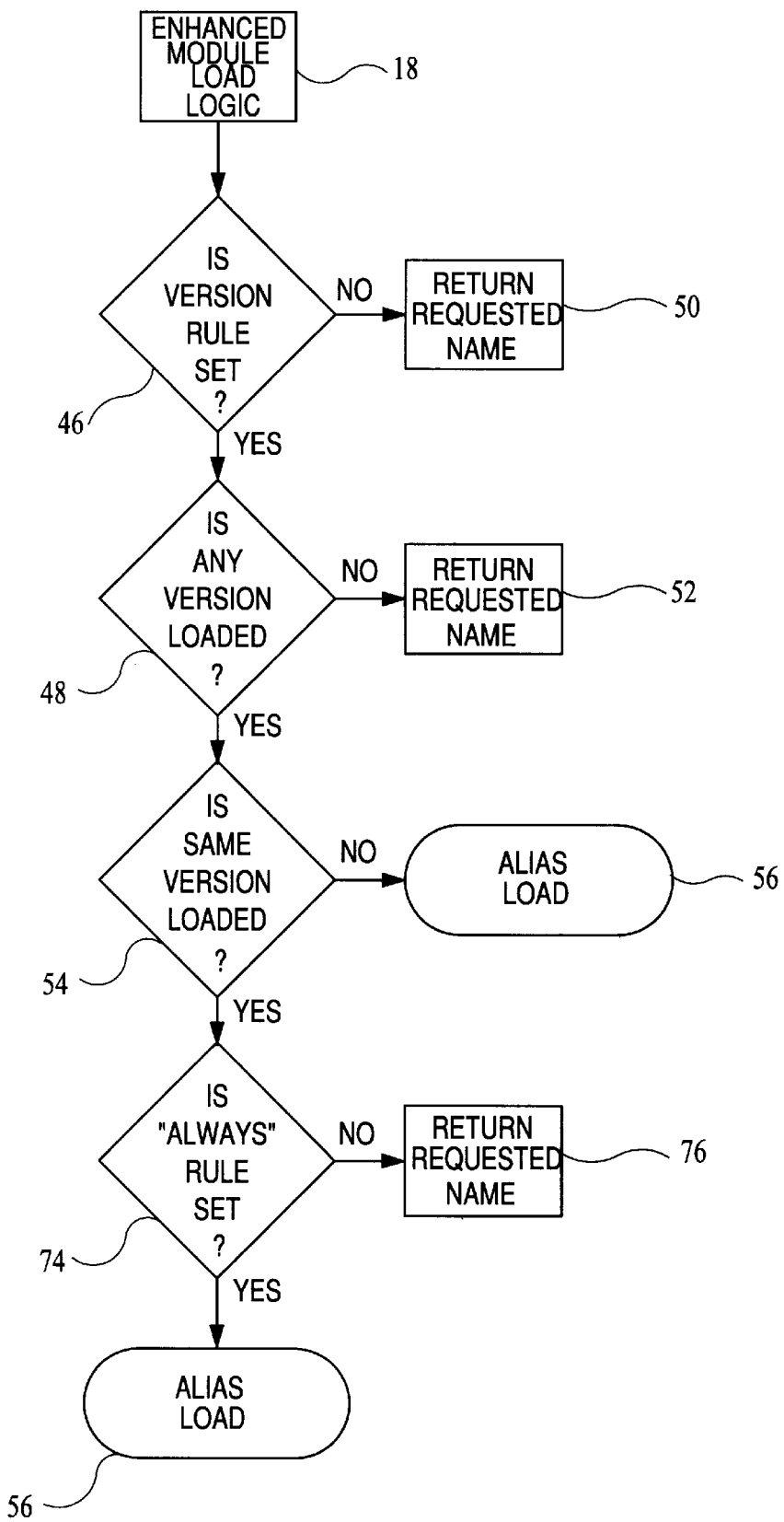
FIG. 3A is a flow chart of the enhanced module version logic illustrated in FIG. 1.
Figure 3B:
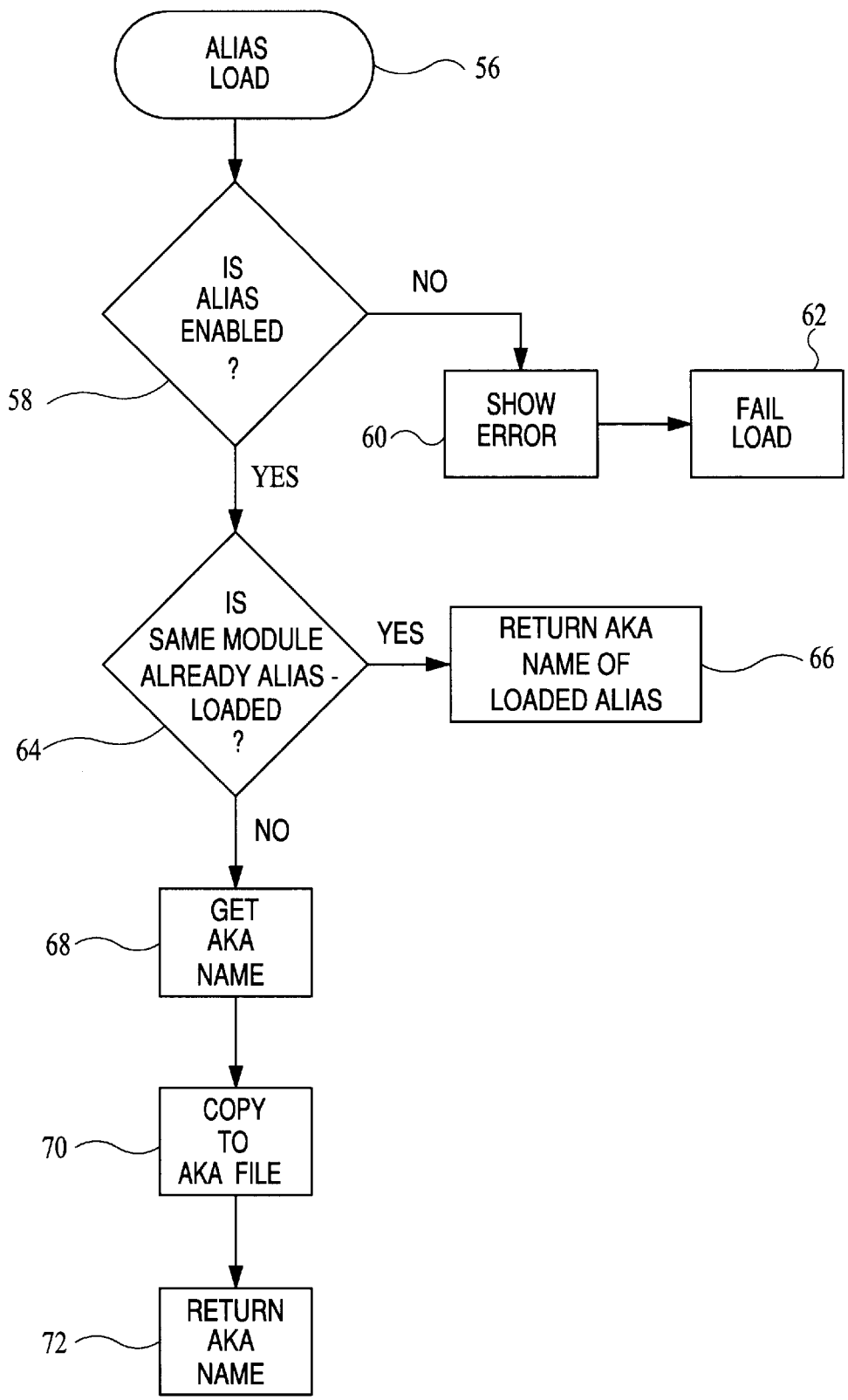
FIG. 3B is a flow chart of the alias load routine employed by the enhanced module version logic shown in FIG. 3A.
Figure 5:
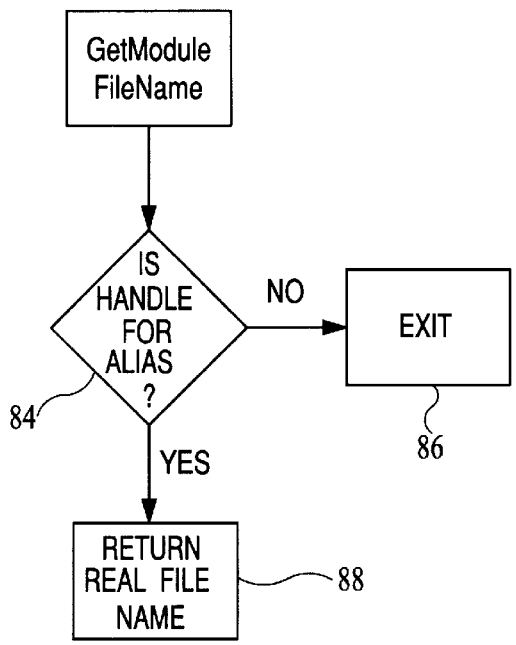
FIG. 5 is a flow chart of a patch to the GetModuleFileName routine, according to a preferred embodiment of the present invention.

FIGS. 3A and 3B illustrate flow charts of the process performed by version logic 42. As shown at step 46 in FIG. 3A, the logic 42 first refers to the module management rules 24 to determine if the "version" rule is set for the requesting application. If the version rule is set, then, at step 48, the logic searches the memory to determine if any version module of the requested name is currently loaded. If the version rule is not set or if some version of the requested module is not currently loaded, then the logic returns the requested name, as indicated at steps 50 and 52. If, however, a module of the requested name is currently loaded, then the logic checks the version key of the loaded module to determine if the loaded module is the same version as the requested module, as shown at step 54. If the loaded module is not the same version, then, as indicated at step 56, the logic will perform an alias load in order to allow both versions of the same named module to be loaded at once.

Turning to FIG. 3B, to perform an alias load, logic 42 first refers to the module management rules to determine whether the "alias" rule is set for the requesting application, as shown at step 58. If the alias rule is not set, then, at step 60, the logic provides an error message indicating, for instance, that the requested module cannot be loaded because a module of the requested name but different version is already loaded. At step 62, the logic would then fail the load. If, however, the alias rule is set, then, at step 64, the logic refers to the AKA database to determine if an already-loaded alias file matches the desired module file by version key and module name. If such an alias file already exists, then, at step 66, logic 42 returns the AKA name of that loaded alias file, thereby causing the operating system to use that alias file rather than unnecessarily making another alias copy of the same file. If, however, such an alias file does not already exist, then logic 42 proceeds to create a new AKA file and return the AKA name of that file. Specifically, at step 68, the logic selects a sequential AKA name for the alias file. At step 70, the logic copies the requested module to an AKA file in an AKA directory. Finally, at step 72, the logic returns the name of the AKA file, so that the operating system will load the AKA file instead of the requested module.

Returning to step 54 in FIG. 3A, the present invention further recognizes that, in some cases, a user may wish to load a module under an alias name even if the same version of the same module is already loaded. To provide this functionality, the present invention may additionally include an "always" rule associated with a specified module, which indicated that the module should always be loaded under an alias name. Therefore, in the preferred embodiment, the version logic 42 of the present invention refers to the module management rules, as indicated at step 74, to determine whether the "always" rule is set for the requesting application. If the "always" rule is not set, then, at step 76, the logic returns the requested name. If, however, the "always" rule is set, then the logic performs an alias load as indicated at step 56 and as discussed above.

Because the enhanced module version logic 42 of the present invention replaces actual module names with alias file names, the invention additionally alters the functionality of various standard module-handling routines to work with the alias file names. These standard module handling functions include, but are not necessarily limited to the FreeModule, GetModuleFileName and GetModuleHandle APIs. FIGS. 4–7 illustrate the patches added for these functions in the preferred embodiment of the present invention.

Figure 4:
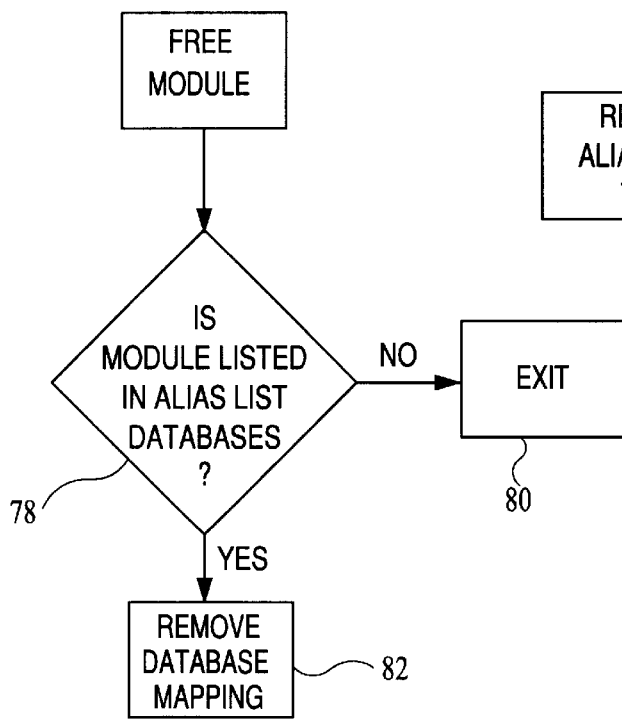
FIG. 4 is a flow chart of a patch to the FreeModule routine, according to a preferred embodiment of the present invention.

In the 16-bit Windows environment, the FreeModule function is called to free or unload a module, given the module's handle. The version logic of the present invention patches this function with code that may be referred to as a "remove-mapping" routine, in order to update the internal alias database when a module that was loaded under an alias name is freed. Referring to FIG. 4, when the FreeModule function receives a module handle of a module to be freed, the version logic looks up the module in the alias list database, as indicated at step 78. If the module is not listed in the alias database, indicating that the module to be freed was not loaded under an alias name, the logic exits and allows the function to proceed normally, as shown at step 80. If the module is listed in the alias database, however, then, as indicated at step 82, the logic removes the mapping (database relationship) between the alias file and the actual file.

The GetModuleFileName function, in contrast, is called to determine the file name of a module referenced by a specified handle. Some applications use this information to locate items based on the directory from which the module was loaded. If, however, the GetModuleFileName function seeks to determine the file name of a module that was loaded under an alias name, the function would erroneously return the alias name rather than the real module name. To avoid this result, when the GetModuleFileName function receives a module handle, the version logic of the present invention (employing code that may be referred to as a "name-routine") beneficially looks up the module handle in the alias list database, as illustrated at step 84 in FIG. 5. If the handle is not listed in the alias database, indicating that the module at issue was not loaded under an alias name, then, at step 86, the logic exists and allows the function to proceed normally. If the handle is listed in the alias database, however, then, at step 88, the logic bypasses the standard GetModuleFileName logic and returns the real module name that was saved in the alias database. More specifically, the logic returns a pointer to the actual file name stored in the alias database.

Figure 6:
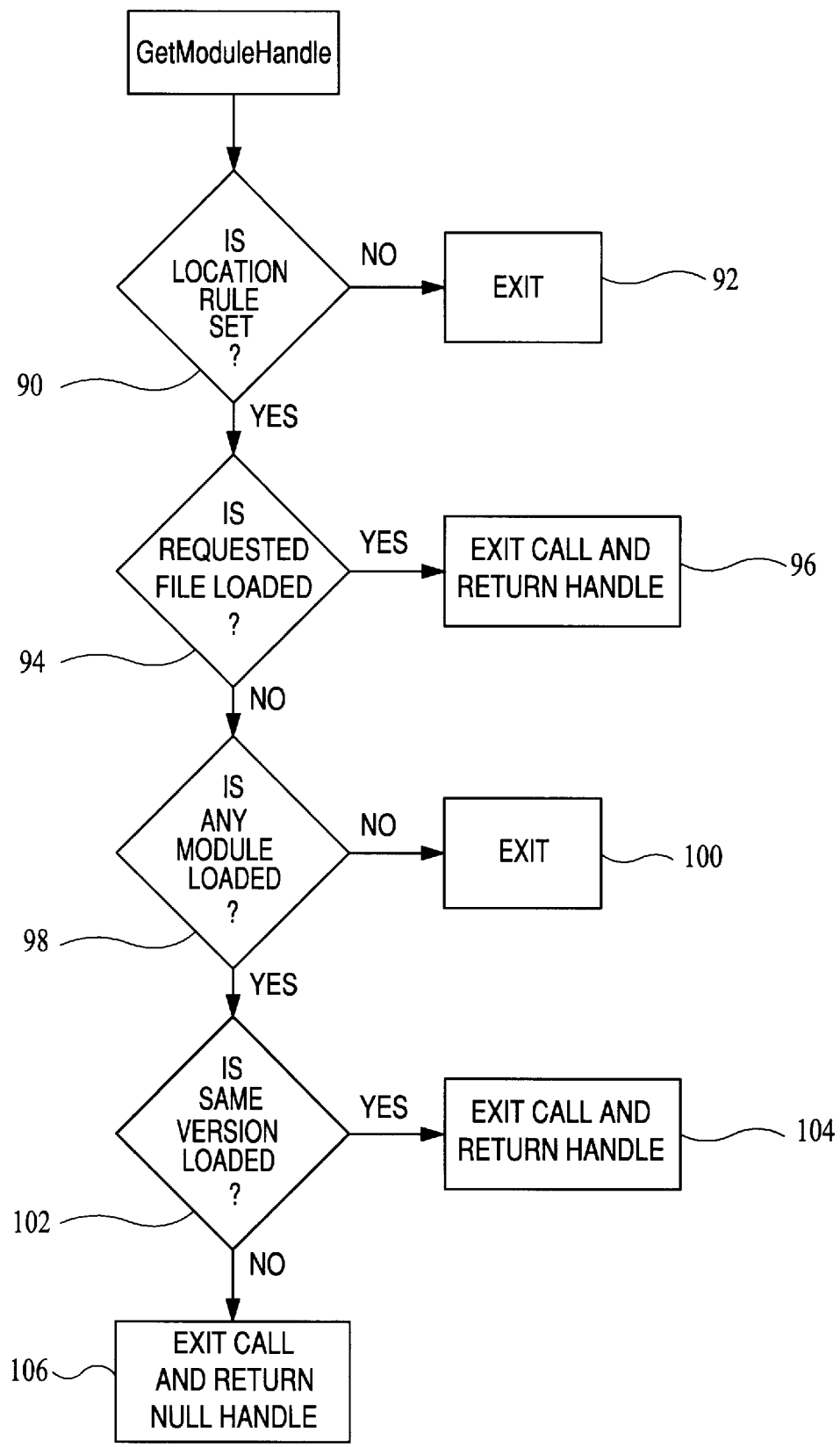
FIG. 6 is a flow chart of a patch to the GetModuleHandle routine, according to a preferred embodiment of the present invention.

Still further, the GetModuleHandle function is called to determine the instance handle assigned to a specified module. This function assumes that there is only one module with the same name loaded at any one time. However, this assumption runs contrary the version logic of the present invention. To facilitate operation of the GetModuleHandle and particularly to return the correct module handle based on a module name, the version logic of the present invention patches the GetModuleHandle function as illustrated in FIG. 6, with code that may be referred to as a "handle-routine."

In the preferred embodiment, when an application calls the GetModuleHandle API, at step 90, the version logic first checks to see, at step 90, whether a rule indicates that the requested DLL should be located in a particular location. As discussed above, these rules may include, for instance, the "system" rule, the "search" rule and the "shared" rule. If no such rule is set, then, at step 92, the logic exits and allows the GetModuleHandle routine to proceed normally. If, however, the requested DLL should be located in a particular location, then, at step 94, the logic next determines whether the requested module is currently loaded from the specified location. To make this determination, in the preferred embodiment, the logic scans the Windows module list, which provides a list of fully qualified paths of currently loaded modules, as well as the handles of those modules. If the module is loaded from the specified location, then, at step 96, the logic exits and returns the handle to the loaded module.

If the requested module is not currently loaded from the specified location, then, at step 98, the logic checks the Windows module list (with reference to the alias database files as necessary) to determine if any module of the requested name is currently loaded, even if the module was loaded from some other location. If no such module is currently loaded, the logic exits. Otherwise, at step 102, the logic compares the version key of the module in the specified location with the version key of the loaded module having the requested name. If the version key matches, then the logic exits and returns the module handle of that loaded module, as indicated at step 104. However, if a module of the requested name and same version key is not currently loaded, then the logic exits and returns a null handle, at step 106, indicating that no such module is loaded.

While the foregoing discussion describes enhanced load logic for loading a DLL module requested by an application, it will be appreciated that the present invention also extends to loading a DLL module requested by another DLL module, or loading an EXE or other type of module requested by another module, or other combinations of these or other requesting and requested modules.

Figure 7:
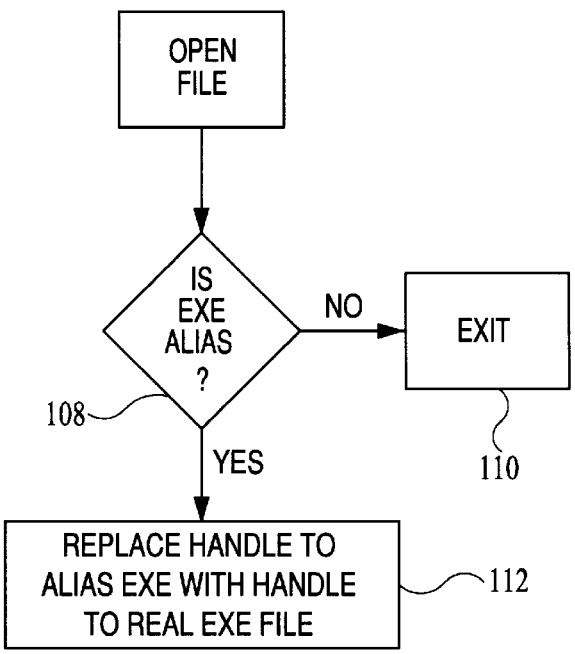
FIG. 7 is a flow chart of a patch to the OpenFile routine, according to a preferred embodiment of the present invention.

Thus, for instance, the version logic described above may be equally applied to EXE modules, to enable a user to load two different versions of the same-named EXE at the same time. In that case, the present invention would additionally apply a patch to the standard Windows OpenFile API to account for the fact that, by default, the OpenFile API looks for an unqualified file in the requesting EXE's directory. As illustrated by FIG. 7, at step 108, the patch for the OpenFile API would first determine if the requesting EXE has been loaded under an alias name, for instance, by reference to the alias list database. If the EXE was not loaded under an alias name, then, at step 110, the patch would exit and return control to the standard OpenFile routine. If the EXE was loaded under an alias name, however, then, by reference to the alias list database, the patch would return to the OpenFile routine a string indicating the name (and corresponding path) of the real EXE file, thereby directing the OpenFile routine to look in the correct directory for the file to open.

2. Module Usage Data Collection Logic

In another aspect, the present invention preferably provides module usage data collection logic. This logic serves to provide users with information regarding module usage and the relationship between modules (including both EXE and DLL modules) in the Windows operating system. This information may assist a system administrator in assessing the impact of module version changes or in installing, moving or upgrading an application.

Existing methods of identifying the relationship of modules in Windows generally involve scanning module header information to identify the implicitly linked modules. However, such methods are incomplete, because scanning module header information will not reveal the identity of modules that are explicitly loaded at execution time or the relationship between these modules and the requesting modules.

To provide a more complete set of information about module usage and relationships, the module usage data collection logic of the present invention employs one or more code patches to expressly monitor activity involving requests to load or free modules. The data collection logic stores this information in a module usage database that may be accessed or referenced by users. In the preferred embodiment, a user may turn on a "collection" rule generally for the entire system (by setting a "collection" flag in a configuration file to TRUE) in order to indicate that module usage data should be collected. Alternatively, upon installing the given application, the collection rule for the application may be turned on automatically.

When the collection rule is set, the patch of the present invention monitors the activity of the internal Windows functions used to load and free modules from memory. In the preferred embodiment, the patch logic is applied just before Windows returns control to an EXE or DLL module that has called another module or that has asked Windows to free another module. When Windows loads a module at the request of an EXE or DLL module, if the collection rule is set, the module usage data collection logic updates the module usage database to indicate the names of (i) the requesting module, (ii) the requested module and (iii) the loaded module. In turn, when Windows frees the loaded module at the request of an EXE or DLL module, the module usage data collection logic updates the module usage database to indicate the names of (i) the requesting module and (ii) the freed module.

Beneficially, the module usage data collection logic of the present invention provides important information to a user. As an example, the invention enables the identification of changes in module usage, such as a situation where Windows loads different DLLs in response to identical requests by an EXE when the EXE is loaded at different times. As another example, a system administrator may identify changes to module files that are loaded by a workstation. For instance, where an end-user indicates to an administrator that an application is not working properly but was working well previously, the administrator may refer to the module usage database and learn that the end-user started using a different EXE module or that the EXE module began requesting different DLLs.

Figure 8:
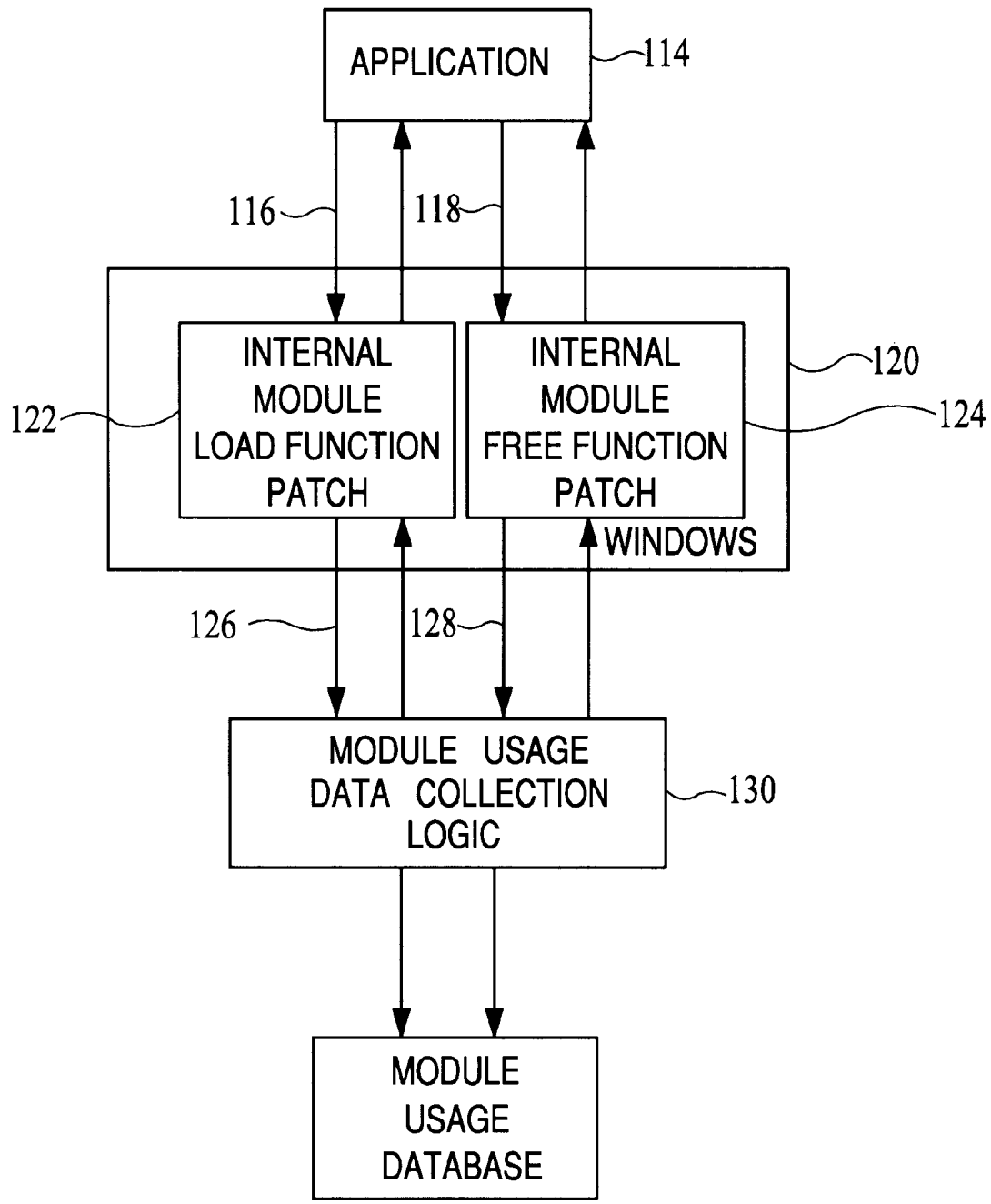
FIG. 8 is a block diagram illustrating the process flow of module usage data collection logic in accordance with a preferred embodiment of the present invention.

FIG. 8 illustrates the process flow of this module usage data collection logic. As shown, an application 114 first issues an API call 116, 118 to the Windows operating system 120 that results in a function call in Windows to load a module or to free a module. As noted above, examples of current API calls that result in a load function call are CreateProcess, LoadLibrary, LoadLibraryEx, LoadModule, and WinExec. Examples of current API calls that result in a free module function call are FreeLibrary, FreeLibraryAndExitThread, and any request to terminate the loading process. The API call 116, 118 identifies by name (in the case of the LoadLibrary function, for instance) or handle (in the case of the FreeLibrary function, for instance) the module to be loaded or freed. The roots 122, 124 of the inventive patch are inserted in the standard Windows module load function and free function and, either directly or through another function call 126, 128, employ module usage data collection logic 130.

Figure 9A:
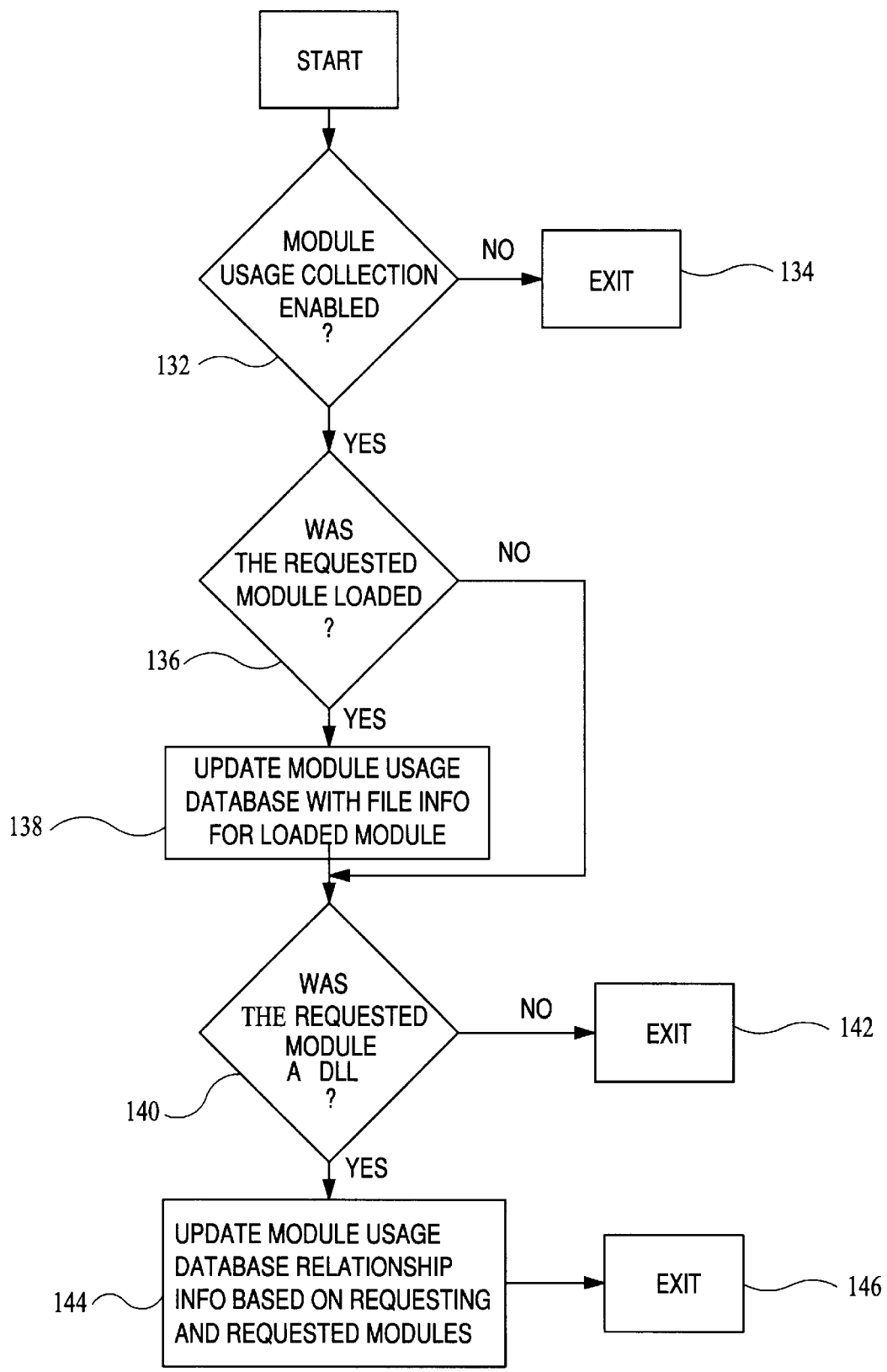
FIG. 9A is a flow chart of an internal module load function patch in accordance with a preferred embodiment of the present invention.
Figure 9B:
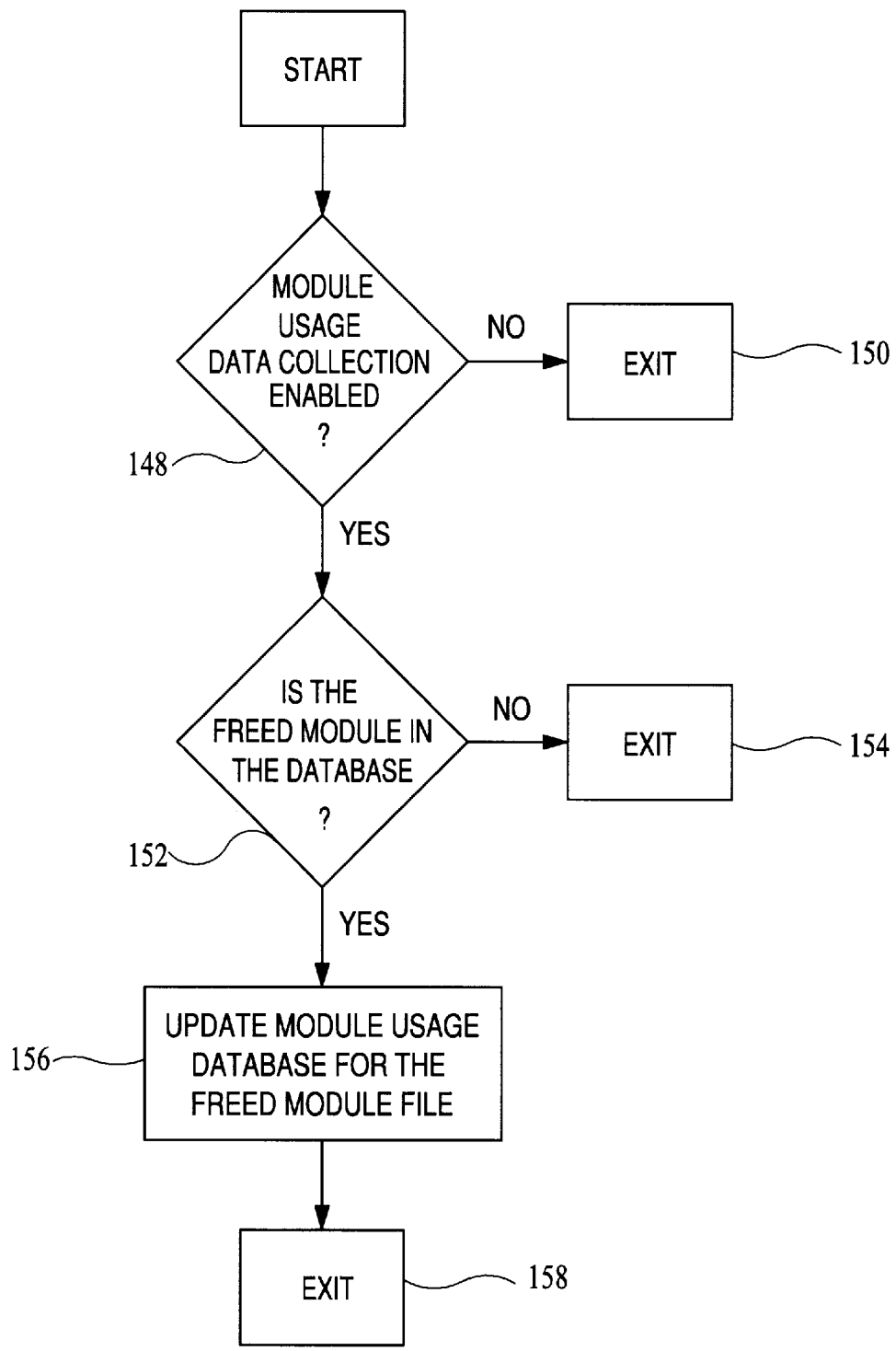
FIG. 9B is a flow chart of an internal module free function patch in accordance with a preferred embodiment of the present invention.

In the preferred embodiment, the module usage data collection logic 130 then collects information regarding the loading and freeing of modules. FIGS. 9A and 9B illustrate flow charts of the processes performed by this logic 130 for a load module API call and a free module API call respectively. Referring first to FIG. 9A, as shown at step 132, the logic 130 first refers to the module management rules to see if the "collection" rule is set. If the collection rule is not set, then, at step 134, the logic 130 exits and returns control to the standard Windows load logic.

If the collection rule is set, then, at step 136, the logic 130 determines if the requested load succeeded, preferably by checking whether or not the module load logic returned a null-return code. If the load was successful, then, at step 138, the logic 130 updates the module usage database with the name of the loaded module. In any event, regardless of whether the load was successful, the logic 130 next determines if the requested module was a DLL rather than a new application (EXE), as indicated at step 140. If the requested module was not a DLL, then, at step 142, the logic 130 exits and returns control to the standard Windows load logic. If the requested module was a DLL, however, then, at step 144, the logic 130 updates the module usage database with information indicating the relationship between the requesting module and the requested DLL.

In the preferred embodiment, if a DLL module load succeeded, the module usage database will provide useful information by relating the name of the requesting module with the name of the loaded DLL module. In turn, at step 146, the logic 130 exits and returns control to the standard Windows load logic. Upon return to the standard Windows load logic, Windows in turn passes control back to the application making the original API request.

Referring now to FIG. 5B, as shown at step 148, the logic 130 first refers to the module management rules to see if the collection rule for the requesting application (or for the EXE module associated with the requesting application) is set. If the collection rule is not set, then, at step 150, the logic 130 exits and returns control to the standard Windows load logic. Otherwise, at step 152, the logic 130 determines if information about the requested module was stored in the module usage database. If not, then, at step 154, the logic 130 exits as well. If, however, information about the requested module was stored in the module usage database, then, at step 156, the logic 130 updates the module usage database to indicate that the module has been freed. At step 158, the logic 130 then exits and returns control to the standard Windows free module function.

SOURCE CODE LISTING

The microfiche appendix to this application contains a printout of source code for performing the enhanced module load logic, the module version logic and the module usage data collection logic in a preferred embodiment of the present invention. This code is written in C++ and Assembly Language, to be compiled, for instance, by a Microsoft Visual C++ compiler and run on a computer with an Intel processor and with any 16-bit or 32-bit Windows operating system.

In the preferred embodiment, patches within the present invention are provided for the following Windows functions and are inserted at the points described:

| | |
|---|---|
| 16-bit *LoadModule* API | Windows exports a 16 bit API called *LoadModule*. After checking for valid parameters, this code jumps to the *ILoadModule* function. The patch is preferably placed at the start of the *ILoadModule* code. |
| 16-bit *FreeModule* API | Windows exporrts a 16 bit API called *FreeModule*. After checking for valid parameters, this code jumps to the *IFreeModule* code. Within *IFreeModule*, a call is made to *DelModule*. The patch is preferably placed at the start of the *DelModule* code. |
| 16-bit *GetModuleFileName* API | Windows exports a 16 bit API called *GetModuleFileName*. After checking for valid parameters, this code jumps to *IGetModuleFileName* code. Within this code, the module file name stored in the module database is retrieved. The patch is preferably placed at the location just after the pointer to the stored module database file name has been set. |
| 16-bit *GetModuleHandle* API | Windows exports a 16 bit API called *GetModuleHandle*. After checking for valid parameters, this code jumps to *IGetModuleHandle* code. The patch is preferably placed at the begining of this code. |
| 16-bit *OpenFile* API (Windows) | Windows exports a 16 bit API called *OpenFile*. After checking for valid parameters, this code jumps to *IOpenFile* code. Within this code, a call is made to an internal routine that searches for the file to open. This internal routine may be called *SearchForFileToOpen*. Within *SearchForFileToOpen*, a call is made to another routine that may be called *SearchForFileToOpenInDirectory*. Within this function, the module file name stored in the module database is retrieved. The patch is preferably placed the patch at the location just after the pointer to the stored module database file name is set. |
| 16-bit *OpenFile API* (Windows 95) | Windows 95 has the ability to call the 32 bit version of the *OpenFile* API from 16 bit code. This call must also be patched from the 16 bit side. The best way to find the patch point is to start with the *WriteOutProfiles* 16 bit API. This function calls a function that may be called *MyOpenModuleFile*. *MyOpenModuleFile* calls a function that may be called *MyOpenFile*. Within this function, the module file name stored in the module database is retrieved. The patch is preferably placed at the location just after the pointer to the stored module database file name is set. |
| 32-bit *LoadLibrary* API | Windows 95 exports a 32 bit API called *LoadLibraryA*. After parameter checking, this function jumps to the *ILoadLibraryA* function. |

| | |
|---|---|
| | *lLoadLibraryA* call an internal function that may be called *RecursiveLoadModule*. *RecursiveLoadModule* calls an internal function that may be called *ModuleLoader*. The patch is preferably placed at the start of the *ModuleLoader* function. |
| 32-bit *FreeLibrary* API | Windows 95 has an internal function that removes a module that is no longer in use. This function may be called *DeleteModule*. There is no easy way to find this function directly. The patch should be placed just before the function deletes the module from memory but may be moved to an alternative location so that the patch point can be more readily located. |

Referring specifically to the code listing in the appendix, Section 1 contains the global structures and variables used to enforce the rules and to build the database. Section 2 contains the code that is responsible for patching the 16 bit Windows module loading code. These sections are called HOOKxxx.CPP and PATCHxxx.CPP where the xxx stands for the Windows API being patched. Section 3 is RULES16.CPP, which is responsible for implementing the enhanced load rules logic for 16 bit modules. These functions are called from the PATCHxxx routines. Section 4 is DBASE16.CPP, which is responsible for building the module usage data base. These functions are also called from the PATCHxxx functions. Section 5 is MODHELP.ASM, which implements the version key logic. Section 6 contains the code that links the 16 bit agent to the Windows 95 32 bit agent. This consists of a virtual device driver, DLLGATOR-.ASM and two VXD.CPP modules, one for 16 bit and one for 32 bit. The VXD provides a communication path between the 16 bit and Windows 95 32 bit agents via a 64K buffer. Section 7 is the patch code for the Windows 95 Agent. It consists of HOOK and PATCH. This code patches the relevant Windows 95 module load functions. Section 8 is RULE95.CPP. This code implements the enhanced module load rules for 32 bit modules under Windows 95. Finally, Section 9 contains the 32 bit data collection logic for Windows 95. It consists of two modules called DBASE95.CPP, one for 32 bit and one for 16 bit. The 32 bit module collects the 32 bit module usage information and passes it to the 16 bit module via the VXD buffer mentioned above. The 16 bit code then adds the data to the module usage database.

Preferred embodiments of the present invention have been illustrated and described. It will be understood, however, that changes and modifications may be made to the invention without deviating from the spirit and scope of the invention, as defined by the following claims.

What I claim is:

1. In a computer system of the type including a processor, a data storage device, and a memory for storing a plurality of modules defining sets of machine language instructions executable by said processor, a first module stored in said memory under a first name,
a second module stored in said data storage device under a second name identical to said first name, but said second module being a different version than said first module,
a module-load routine stored in said memory and executable by said processor to load a requested module from said data storage device into said memory,
said module-load routine receiving a request to load said second module from said data storage device into said memory, a module management system comprising:
an alias-load routine stored in said memory and executable by said processor, said alias-load routine associating an alias file name with said second module and passing said alias file name to said module-load routine, whereby said module-load routine loads a copy of said second module into said memory under said alias file name.

2. A module management system as claimed in claim 1, wherein said alias-load routine associates said alias file name with said second module by a process comprising making an alias file copy of said second module on said data storage device under said alias file name, whereby said module-load routine loads said alias file copy into said memory.

3. A module management system as claimed in claim 1, further comprising an alias rule selectively set to indicate that said alias-load routine should establish an alias file corresponding to said second module.

4. A module management system as claimed in claim 3, wherein, when said alias rule is set, said alias-load routine establishes an alias file corresponding to said requested module only if said requested module has a name identical to the name of a module currently loaded into said memory.

5. A module management system as claimed in claim 3, wherein said alias rule is stored in a configuration file.

6. A module management system as claimed in claim 5, wherein said alias rule is selectively set by a human interacting with said computer system.

7. A module management system as claimed in claim 1, further comprising a database file containing a record of alias module loads.

8. A module management system as claimed in claim 7, wherein said database file contains information defining an association between said alias file name and said second module name.

9. In a computer system of the type including a processor, a data storage device, and a memory for storing a plurality of modules defining sets of machine language instructions executable by said processor, a first module stored in said memory under a first name,
a second module stored in said data storage device under a second name identical to said first name, but said second module being a different version than said first module,
a module-load routine stored in said memory and executable by said processor to load a requested module from said data storage device into said memory,
said module-load routine receiving a request to load said second module from said data storage device into said memory, a free-module routine stored in said memory and executable by said processor to free from said memory a specified module, a module management system comprising:

an alias-load routine stored in said memory and executable by said processor, said alias-load routine associating an alias file name with said second module and passing said alias file name to said module-load routine, whereby said module-load routine loads a copy of said second module into said memory under said alias file name;

a database file containing a record of alias module loads, said database file containing information defining an association between said alias file name and said second module name; and a remove-mapping routine stored in said memory and executable by said processor, said remove-mapping routine removing said association from said database file responsive to said free-module routine freeing said copy of said alias file from said memory.

10. In a computer system of the type including a processor, a data storage device, and a memory for storing a plurality of modules defining sets of machine language instructions executable by said processor, a first module stored in said memory under a first name, a second module stored in said data storage device under a second name identical to said first name, but said second module being a different version than said first module, a module-load routine stored in said memory and executable by said processor to load a requested module from said data storage device into said memory, said module-load routine receiving a request to load said second module from said data storage device into said memory.

a get-module-filename routine stored in said memory and executable by said processor to provide a name of a module associated with a specified module handle, a module management system comprising:

an alias-load routine stored in said memory and executable by said processor, said alias-load routine associating an alias file name with said second module and passing said alias file name to said module-load routine, whereby said module-load routine loads a copy of said second module into said memory under said alias file name;

said alias-load routine associating said alias file name with said second module by a process comprising making an alias file copy of said second module on said data storage device under said alias file name, whereby said module-load routine loads said alias file copy into said memory; and a name-routine stored in said memory and executable by said processor to provide said get-module-filename routine with said second module name when said specified module handle corresponds to said alias file copy.

11. In a computer system of the type including a processor, a data storage device, and a memory for storing a plurality of modules defining sets of machine language instructions executable by said processor, a first module stored in said memory under a first name, a second module stored in said data storage device under a second name identical to said first name, but said second module being a different version than said first module, a module-load routine stored in said memory and executable by said processor to load a requested module from said data storage device into said memory, said module-load routine receiving a request to load said second module from said data storage device into said memory, a get-module-handle routine stored in said memory and executable by said processor to provide a handle of a module associated with a specified module name, a module management system comprising:

an alias-load routine stored in said memory and executable by said processor, said alias-load routine associating an alias file name with said second module and passing said alias file name to said module-load routine, whereby said module-load routine loads a copy of said second module into said memory under said alias file name;

said alias-load routine associating said alias file name with said second module by a process comprising making an alias file copy of said second module on said data storage device under said alias file name, whereby said module-load routine loads said alias file copy into said memory; and a handle-routine stored in said memory and executable by said processor to provide said get-module-handle routine with a pointer to said alias file copy when said specified module name corresponds to said alias file copy and said alias file copy is the same version as said specified module.

12. In a computer system of the type including a processor, a memory for holding code modules associated with a plurality of applications, and an operating system including a module load routine for loading a module into said memory, said operating system running a first application associated with a first module, said first module having a first module name and being loaded into said memory, said operating system loading a second module associated with a second application, said second module having a second module name identical to said first module name but said second module being a different version than said first module, a method for managing multiple modules comprising, in combination:

associating said second module with an alias file name; and providing said alias file name to said module load routine, whereby said module load routine loads an alias copy of said second module into said memory under said alias file name.

13. A method as claimed in claim 12, further comprising setting an alias rule indicating that a module associated with said second application should be loaded under an alias file name.

14. A method as claimed in claim 13, wherein said alias rule is contained in a configuration file.

15. A method as claimed in claim 12, further comprising recording in a database file a relationship between said alias copy and said second module.

16. In a computer system of the type including a processor, an operating system and a common memory space for holding DLL modules associated with a plurality of applications, said operating system including a module load routine for loading a DLL module into said common memory space, said operating system running a first application associated with a first DLL module, said first DLL module having a first DLL module name and being loaded into said common memory space, said operating system establishing a first module handle pointing to said first DLL module name and thereby identifying said first DLL module in said common memory space, said operating system loading a second application associated with a second DLL module, said second DLL module having a second DLL module name identical to said first DLL module name but said second DLL module being a different version than said first DLL module, an improved method for managing multiple DLL modules comprising, in combination:

associating said second DLL module with an alias file name; and providing said alias file name to said module load routine, whereby said operating system loads said second DLL module into said common memory space under said alias file name, and said operating system establishes a second module handle pointing to said alias file name and thereby identifying said second DLL module in said common memory space.

17. An improved method as claimed in claim 16, wherein associating said second DLL module with an alias file name comprises:

establishing a version key uniquely identifying said second DLL module;

recording in a database file information indicating said version key, information indicating said alias file name and information indicating said second DLL module name.

18. An improved method as claimed in claim 17, wherein, when said operating system seeks to free said second DLL module from said common memory space by a function call keyed to said second module handle, said operating system looks up said alias file name in said database file and frees from said common memory space a module having said alias file name.

19. An improved method as claimed in claim 17, wherein, when an object in said computer system requests the name of a module corresponding to said second module handle, said operating system looks up said second DLL module name in said alias database file and provides said second DLL module name to said object.

20. An improved method as claimed in claim 17, wherein, when (i) an object in said computer system requests the handle of a module by a query keyed to a specified module name, (ii) a module having said second DLL module name is not currently loaded into said common memory space and (iii) said alias file name and said version key of said second DLL module are associated with said specified module name, said operating system returns said second module handle.

21. An improved method as claimed in claim 17, wherein said first and second DLL modules are 16 bit modules.

\* \* \* \* \*